March 10, 1953     B. J. TROCKI     2,630,726
ADJUSTABLE CUTTING TOOL
Filed Dec. 29, 1949
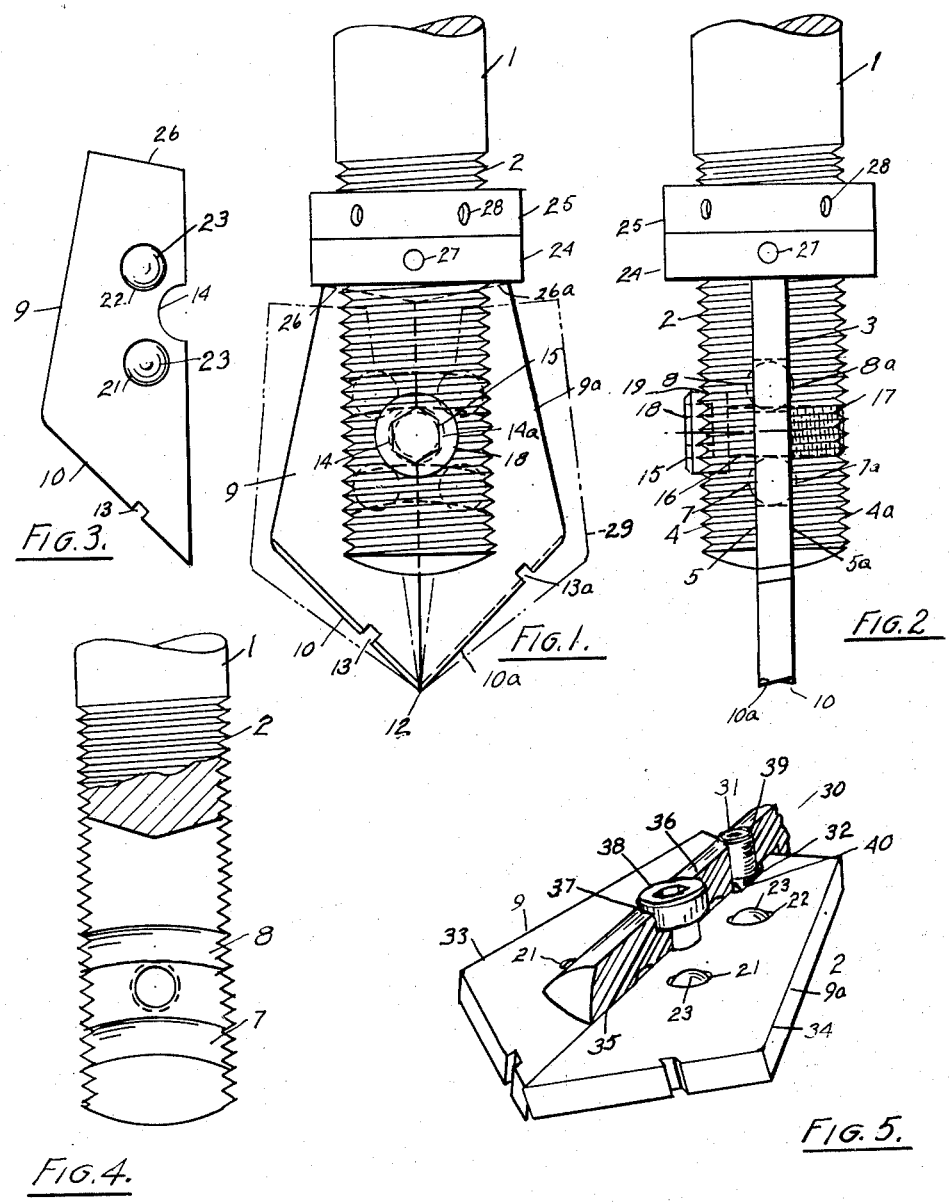
INVENTOR.
Bernard J. Trocki
BY
Florian G. Miller
Atty.

Patented Mar. 10, 1953

2,630,726

UNITED STATES PATENT OFFICE 2,630,726

ADJUSTABLE CUTTING TOOL

Bernard J. Trocki, Erie, Pa.

Application December 29, 1949, Serial No. 135,768

6 Claims. (Cl. 77—75)

This invention relates generally to drilling or boring tools and more particularly to an adjustable drilling or boring tool.

All devices of this character, made in accordance with the teachings of the prior art, have provided blades longitudinally movable in tapered slots to adjust the diameter to form a tool which may be used for reaming but one which could not be used for drilling or boring. No suitable means has heretofore been provided for attaching blades to a shaft to form an adjustable boring tool. Work within close tolerances has not been possible to perform with prior adjustable boring tools. Furthermore, it has not been possible to adjust the diameter of these prior adjustable cutting tools while they remain in an operative position in the tailstock of a lathe or like machine. No adjustable cutting tool has heretofore been provided wherein the center of the cutting edge of the adjustable cutting blades remains in axial alignment with the longitudinal axis of the shank of the drill.

It is, accordingly, an object of my invention to overcome the above and other defects in prior adjustable cutting tools and it is more particularly an object of my invention to provide an adjustable cutting tool which is simple in construction, economical in cost, economical in manufacture, efficient in operation, and simple and easy to adjust.

Another object of my invention is to provide a cutting tool having adjustable blades defining a cutting edge having a center always in axial alignment with the longitudinal axis of the shank.

Another object of my invention is to provide an adjustable cutting tool with blades rotatable outwardly on a radius extending from a point formed by the center of the cutting edge formed by said blades in axial alignment with the longitudinal axial center line of the shank of said cutting tool.

Other objects of my invention will become evident from the following detailed description, taken in conjunction with the accompanying drawings, in which Fig. 1 is a side elevational view of my novel adjustable cutting tool showing the outermost position of the cutting blades of the tool in dotted lines;

Fig. 2 is a side elevational view of my adjustable cutting tool at right angles to the elevation shown in Fig. 1;

Fig. 3 is a side elevational view of one of the cutting blades of my novel adjustable cutting tool;

Fig. 4 is a fragmentary side elevational view showing the bearing grooves for guiding the blades in my novel adjustable cutting tool; and Fig. 5 is a perspective view of a modified form of my novel adjustable cutting tool.

Referring now to the drawings, I show in Figs. 1 to 4 inclusive a round shaft or shank 1 having an externally threaded portion 2 on one end thereof which is split longitudinally at 3 in the longitudinal axial plane of the shank 1. The split or slot 3 forms one-half round mating halves 4 and 4a. On the inner sides 5 and 5a of the mating halves 4 and 4a respectively, arcuate shaped, longitudinally spaced, rounded grooves 7 and 8 and 7a and 8a are formed, the slots 7 and 8 and 7a and 8a being parallel and opposite to each other and having the same respective radii. Mated cutting blades 9 and 9a having cutting edges 10 and 10a respectively are disposed in the slot 3 of the shank 1 between the halves 4 and 4a in opposed relationship to define a V-shaped cutter terminating at a point 12 in axial alignment with the longitudinal axis of the shank 1. The blades 9 and 9a have slots 13 and 13a respectively to break up chips. The mated blades 9 and 9a have semi-circular shaped slots 14 and 14a respectively for fitting around a locking screw 15, the locking screw 15 extending through an aperture 16 in the mating half 4 and being threadably engaged with a threaded aperture 17 in the mating half 4a. The head 18 of the locking screw 15 seats in a counterbore 19 in the mating half 4. The mated blades 9 and 9a have apertures 21 and 22 spaced longitudinally a distance equal to the distance between the arcuate slots 7 and 8 and 7a and 8a respectively on the inner sides 5 and 5a of the mating halves 4 and 4a. The apertures 21 and 22 carry balls 23, the opposite sides of which engage and move in the arcuate shaped grooves 7 and 8 and 7a and 8a on the innersides 5 and 5a of the mating halves 4 and 4a of the shank 1. The radii of the arcuate shaped grooves 7 and 8 and 7a and 8a respectively are drawn from the center 12 formed by the cutting edges 10 and 10a of the blades 9 and 9a respectively. Threaded locking collars 24 and 25 are threadably engaged with the threaded portion 2 of the shank 1 and engage the ends 26 and 26a of the blades 9 and 9a opposite to the cutting edges 10 and 10a thereof. The ends 26 and 26a form inwardly diverging acute angles with reference to the adjacent side of the collar 24 so that the ends 26 and 26a of the blades 9 and 9a are moved outwardly around the pivot point 12 upon longitudinal movement of the collars 24 and 25 thereagainst.

The blades 9 and 9a are movable from an inward position shown in solid lines in Fig. 1 to an extreme outward position as shown in dotted lines 29 in Fig. 1 wherein the ends 26 and 26a of the blades 9 and 9a are substantially parallel with the adjacent side of the adjusting collar 24. The adjusting collars 24 and 25 have recesses 27 and 28 for engagement by a shaft, bar, spanner wrench, or the like to rotate same.

In operation, the locking screw 15 is disengaged from the threaded aperture 17 in the mating half 4a of the shank 1 to permit rotative movement of the blades 9 and 9a in the split portion 3 of the shank 1. The adjusting collars 24 and 25 are then rotated to move the blades 9 and 9a outwardly around the point 12 in axial alignment with the longitudinally extending axis of the shank 1. Opposite sides of the balls 23 carried in the apertures 21 and 22 of the blades 9 and 9a engage and move in the rounded grooves 7 and 8 and 7a and 8a on the inner sides 5 and 5a of the mating halves 4 and 4a. The outermost diameter of the blades 9 and 9a is measured and when the desired diameter is obtained, the locking screw 15 is threadably engaged with the threaded aperture 17 in the mating half 4a of the shank 1 and the blades 9 and 9a are locked between the mating halves 4 and 4a of the shank 1 in a predetermined position. Because the radii of the grooves 7 and 8 and 7a and 8a are different, lateral movement of the blades 9 and 9a is prevented inasmuch as there is more or less of a braking or snubbing action between the balls 23 and the grooves 7 and 7a. The blades 9 and 9a are thus held rigidly in any predetermined position thereby eliminating shattering and permitting boring of a hole within extremely close tolerances. A reamer is not necessary with my novel cutting tool inasmuch as a hole may be bored, the blades 9 and 9a may be adjusted outwardly by means of the collars 24 and 25, and the hole may be reamed to the desired diameter. My tool may thus be used as a drill or a reamer or any other similar cutting tool.

In Fig. 5, I show a modified cutting tool which is identically the same as my cutting tool shown in Figs. 1 to 4 inclusive except that the end of the shank 30 is not threaded and a threaded pin 31 with a cone shaped end 32 is provided for spreading the blades instead of the adjusting rings 24 and 25 shown in Figs. 1 and 2. Fig. 5 shows mated cutting blades 9 and 9a identically the same as the cutting blades 9 and 9a shown in Fig. 1, including ball bearing retaining apertures 21 and 22 and balls 23. The blades are chamfered at 40 at the point of engagement with the end 32 of the pin 31. The shank 30 is longitudinally split at 35 for receiving the blades 33 and 34. The split 35 forms mating halves 36, one mating half 36 having an aperture 37 for receiving a locking screw 38 and a threaded aperture 39 for threadably receiving the threaded adjusting pin 31 with the cone shaped end 32 movable between the blades 33 and 34 to move them outwardly for adjustment thereof. The operation of the adjustable cutting tool shown in Fig. 5 is the same as the operation of the cutting tool shown in Figs. 1 to 4 inclusive.

It will be evident from the foregoing description that I have provided a novel adjustable cutting tool which always has the point of the cutter in axial alignment with the longitudinal axis of the shank, which has novel means for holding the adjustable cutting blades rigidly in the end of the shank, which permits adjustment of the tool while it is positioned in a tailstock or the like, and which has other novel arrangements and construction of parts.

Various changes may be made in the specific embodiment of my invention without departing from the spirit thereof or from the scope of the appended claims.

What I claim is:

1. A cutting tool comprising a cylindrical shank having a longitudinally split slot on one end thereof, said slot defining arcuate shaped mating halves having opposed, parallel, arcuate shaped grooves on the inner sides thereof, opposed cutting blades disposed in said slot having cutting edges defining a substantially V-shaped cutter extending outwardly from said shank, balls carried by said blades having portions thereof extending outwardly from opposite sides thereof movable in said grooves in said mating halves, and means for securing said blades in said slot in a predetermined position.

2. A cutting tool comprising a cylindrical shaft having a longitudinally split slot on one end thereof, the inner sides of said split portions of said shaft having longitudinally spaced, arcuate shaped, parallel grooves, opposed cutting blades having engageable inner sides disposed in said slot defining a cutting edge terminating in a point extending axially outwardly from the end of said shaft, members carried by said blades having outwardly extending portions on opposite sides of said blades for engagement with and movement in said arcuate shaped grooves, said arcuate grooves having a radius struck from the point defined by said cutting blades, means for moving said blades rotatively around the point of said cutting edge defined thereby, and means for locking said blades in said slot.

3. A cutting tool as set forth in claim 2 wherein the outwardly projecting portions on said blades comprise the sides of ball members carried by said blades.

4. A cutting tool comprising a cylindrical shank having a longitudinally split slot on one end thereof defining opposed mating halves, the inner sides of said mating halves having opposed, longitudinally spaced arcuate slots, opposed cutter blades disposed in said slot between said mating halves having longitudinally, outwardly extending cutting edges defining a substantially V-shaped cutting edge with the apex thereof in axial alignment with the longitudinal axis of said shank, the radius of curvature of said slots on the inner sides of said mating halves being measured from a point at the apex defined by said V-shaped cutting edge of said blades, ball camming members movably seated in apertures formed in said blades extending outwardly from opposite sides thereof engageable with and movable in said grooves in the inner sides of said mating halves of said shank, means for securing said blades in said slot, and means for moving said blades laterally around the apex of the V-shaped cutting edge defined by said blades.

5. A cutting tool comprising a shank having a longitudinally split slot on one end thereof, said slot defining mating halves having opposed, parallel, arcuate shaped grooves on the inner sides thereof, opposed cutting blades disposed in said slot having cutting edges defining a substantially V-shaped cutter extending outwardly from said shank, balls carried by said blades having portions thereof extending outwardly from opposite sides thereof movable in said grooves in said mating halves, and means for securing said blades in said slot in a predetermined position.

6. A cutting tool comprising a shaft having a longitudinally split slot on one end thereof, the inner sides of said split portions of said shaft having longitudinally spaced, arcuate shaped, parallel grooves, opposed cutting blades having engageable inner sides disposed in said slot defining a cutting edge terminating in a point extending axially outwardly from the end of said shaft, members carried by said blades having outwardly extending portions on opposite sides of said blades for engagement with and movement in said arcuate shaped grooves, means for moving said blades rotatively around the point of said cutting edge defined thereby, and means for locking said blades in said slot.

BERNARD J. TROCKI.

REFERENCES CITED

The following references are of record in the file of this patent:

UNITED STATES PATENTS

| Number | Name | Date |
|---|---|---|
| 126,120 | Whitin | Apr. 23, 1872 |
| 186,513 | Adams | Jan. 23, 1877 |
| 1,411,965 | Ganster | Apr. 4, 1922 |
| 1,666,926 | Davis | Apr. 24, 1928 |

FOREIGN PATENTS

| Number | Country | Date |
|---|---|---|
| 404,836 | Great Britain | Jan. 25, 1934 |